Jan. 19, 1926.            1,569,878
C. PEARSON
POWER LIFT FOR MOWER BARS
Filed Sept. 19, 1921     5 Sheets-Sheet 1

Inventor:-
Charles Pearson,
By H.P. Daniels
Atty.

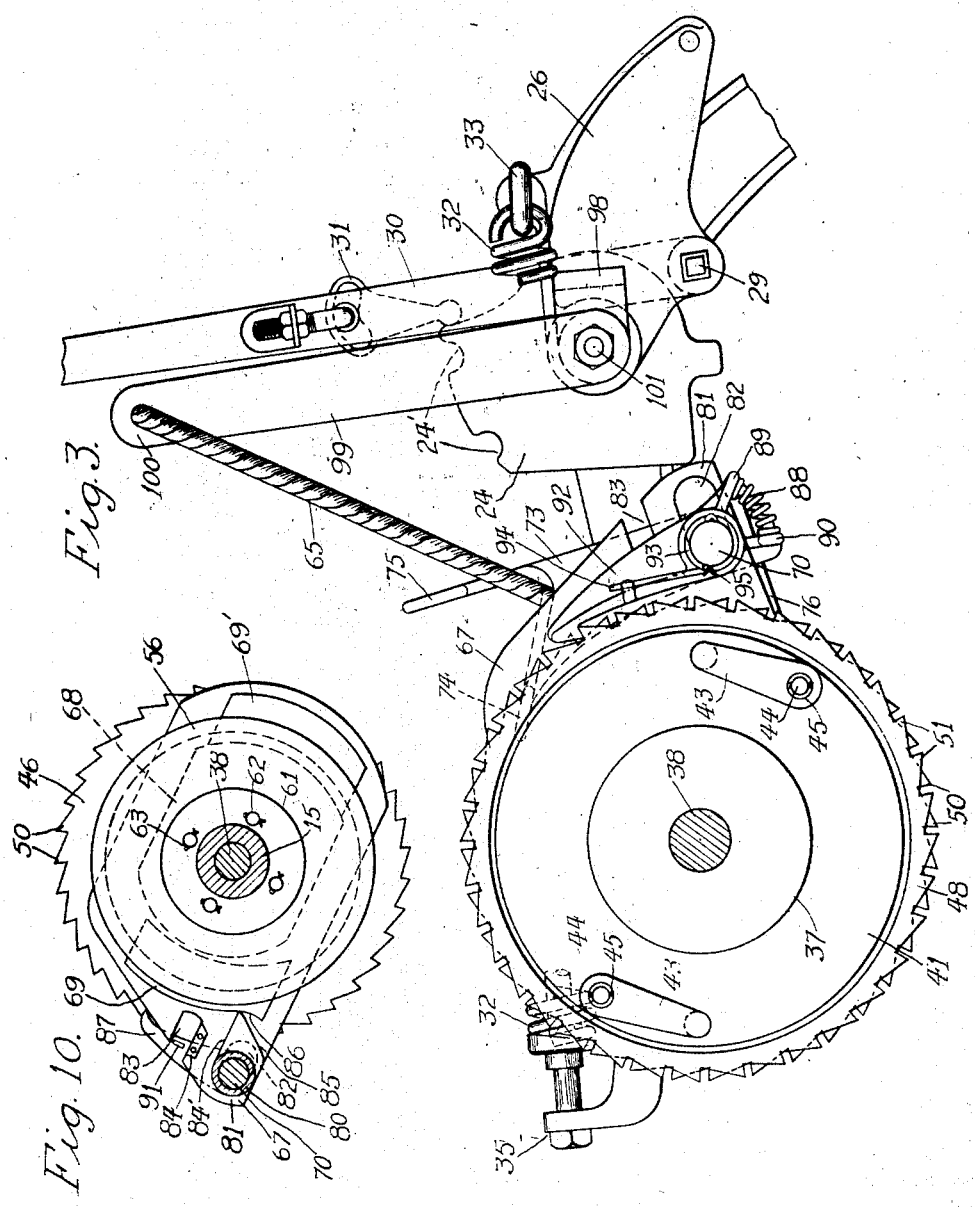

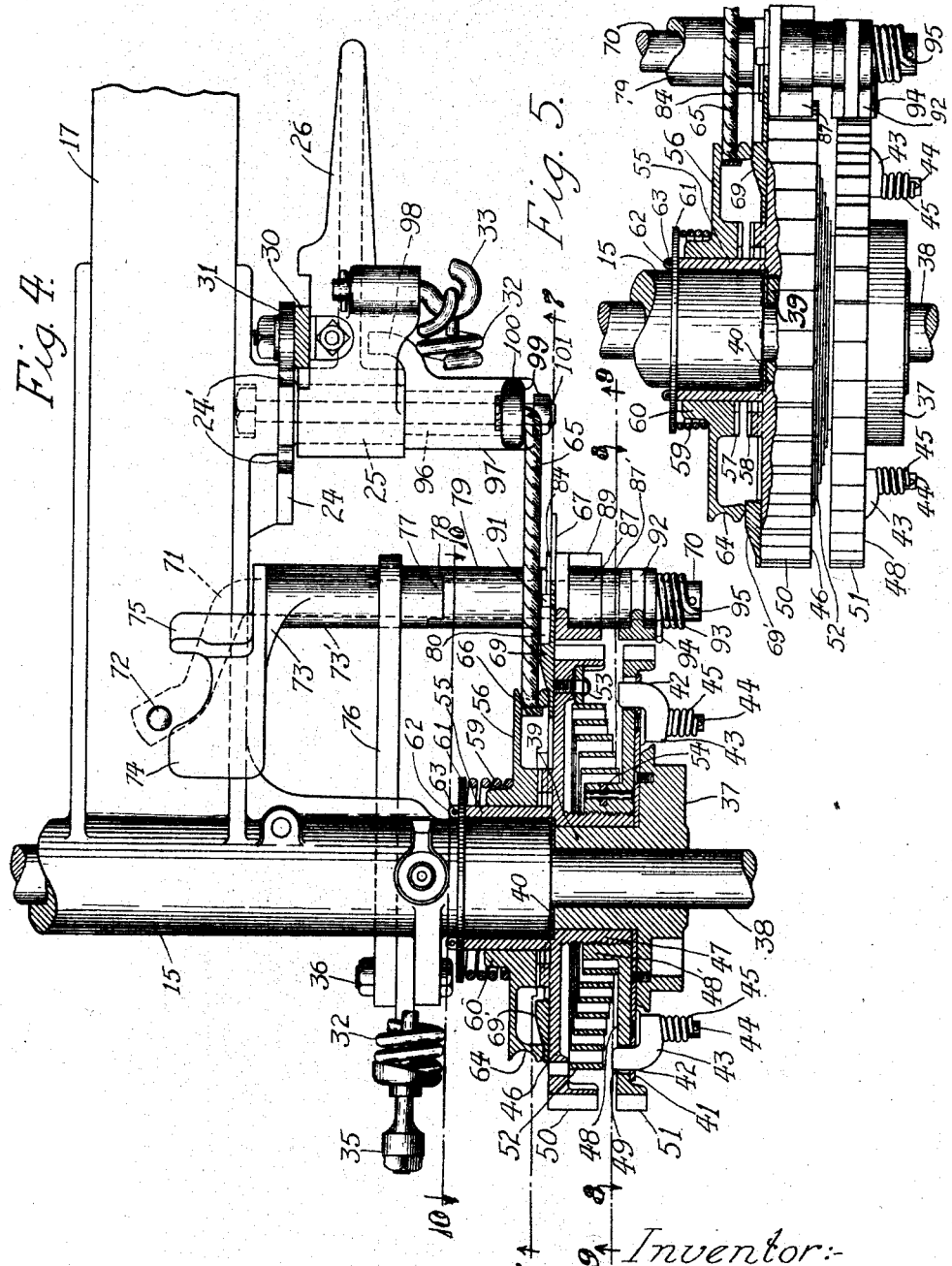

Jan. 19, 1926. 1,569,878
C. PEARSON
POWER LIFT FOR MOWER BARS
Filed Sept. 19, 1921 5 Sheets-Sheet 4
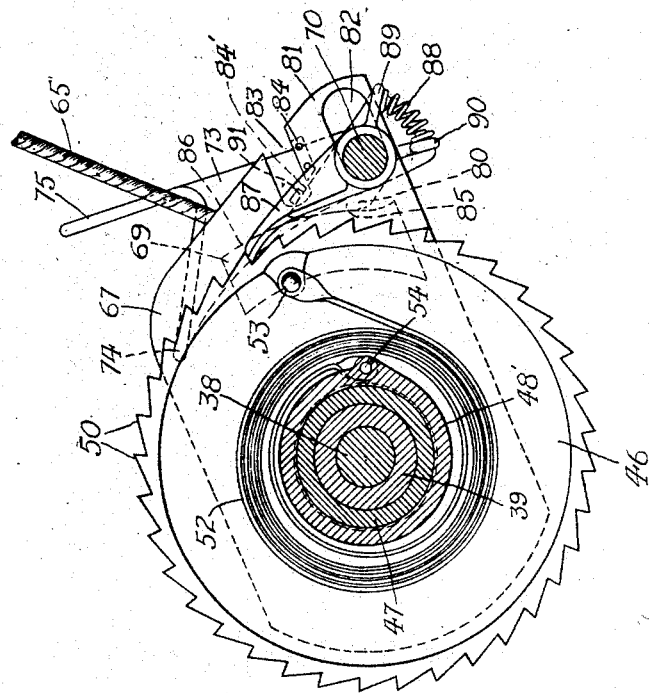
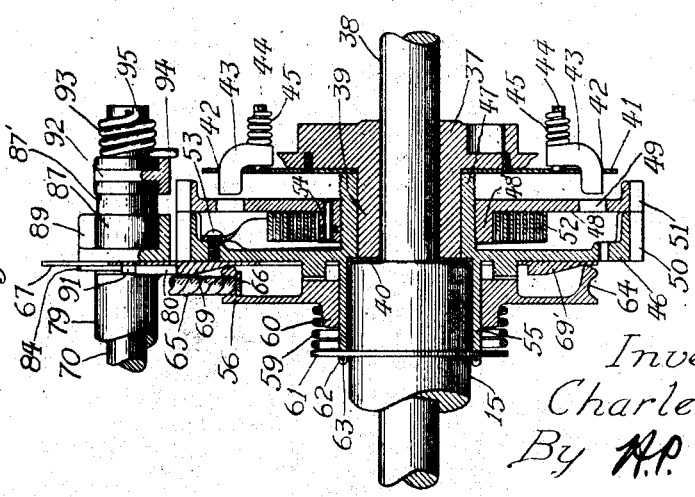
Inventor:
Charles Pearson,
By H.P. Danieth
Atty.

Jan. 19, 1926.  
C. PEARSON  
POWER LIFT FOR MOWER BARS  
Filed Sept. 19, 1921     5 Sheets-Sheet 5

1,569,878

Inventor:-  
Charles Pearson,  
By H.P. Doolittle  
Atty.

Patented Jan. 19, 1926.

1,569,878

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

POWER LIFT FOR MOWER BARS.

Application filed September 19, 1921. Serial No. 501,812.

*To all whom it may concern:*

Be it known that I, CHARLES PEARSON, a citizen of the United States, residing at Chicago, in the county of Cook and State of Illinois, have invented certain new and useful Improvements in Power Lifts for Mower Bars, of which the following is a full, clear, and exact specification.

My invention relates to mowers, and more particularly to mechanism for raising and lowering the cutter bar or finger bar of the mower in an improved manner.

One of the objects of my invention is to provide a device which will raise the cutter bar of the mower by power. A further object is to provide a device in which the tractive power is stored in a spring and may be used at the will of the operator to raise the cutter bar; a still further object is to provide a device in which the tractive power and spring power mechanism is automatically connected and disconnected.

These and other objects are obtained by providing means for transmitting the power from the traction wheel of the mower to the lifting mechanism of the cutter bar. More specifically stated, the invention in the present instance comprises means for storing tractive power in a spring and suitable connections from the spring to the lifting mechanism for raising the cutter bar. The invention in the present instance consists in general of certain novel details of construction and combination of parts hereinafter fully described and illustrated in the accompanying drawings and specifically claimed.

In the accompanying drawings like characters of reference indicate like parts throughout the several views.

Fig. 3 is an enlarged side elevational view of the power lift mechanism as shown in Fig. 2.

Fig. 4 is an enlarged plan view partly in section of the mechanism shown in Fig. 3 and showing the helical spring unwound.

Fig. 5 is an enlarged detail view showing the winding drum disengaged from the spring disk.

Fig. 6 is an enlarged detail plan view showing the spring completely wound up and the winding drum engaged with the spring disk.

Figure 1:
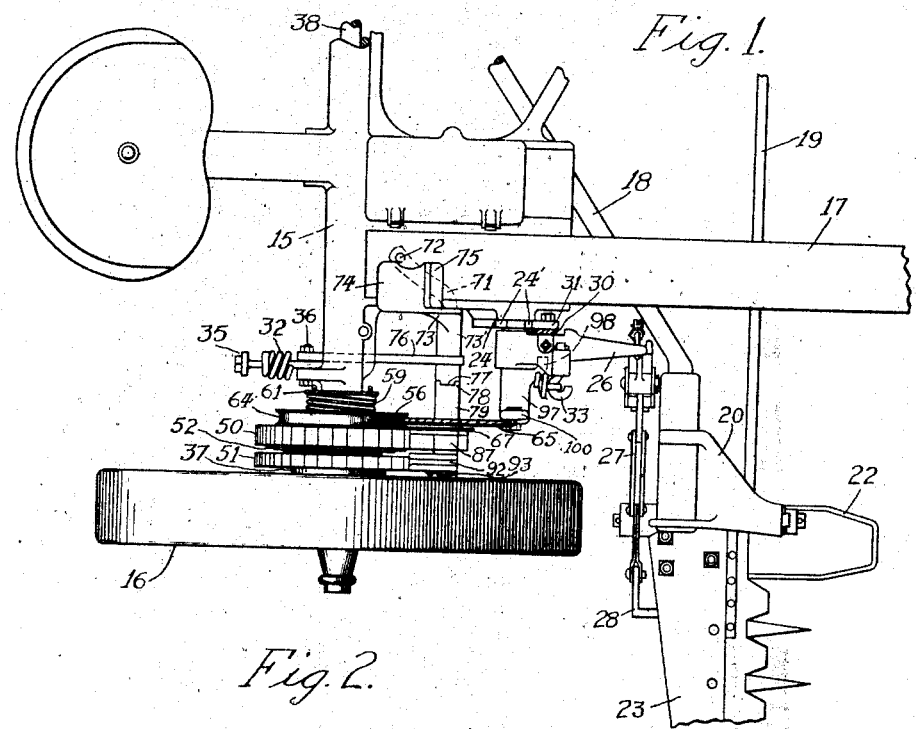
Fig. 1 is a top plan view embodying my invention.
Figure 2:
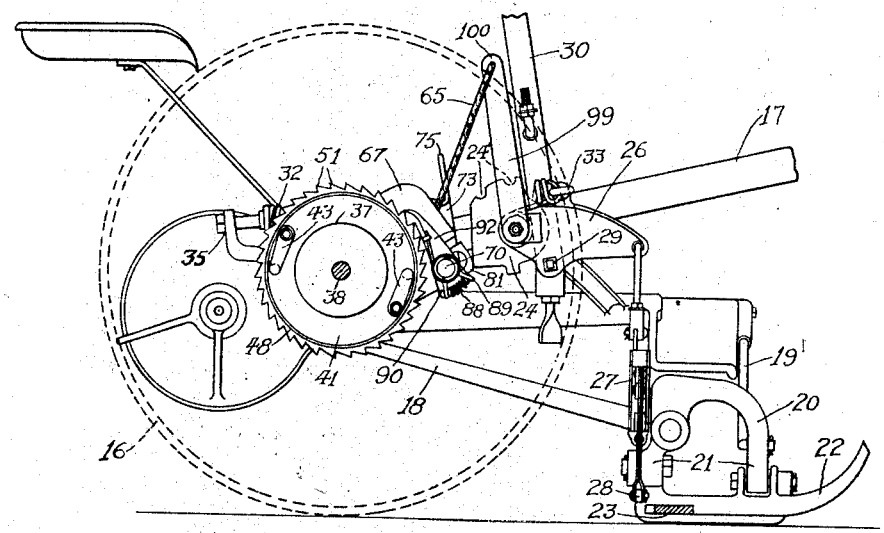
Fig. 2 is a side elevational view of Fig. 1.
Figure 8:
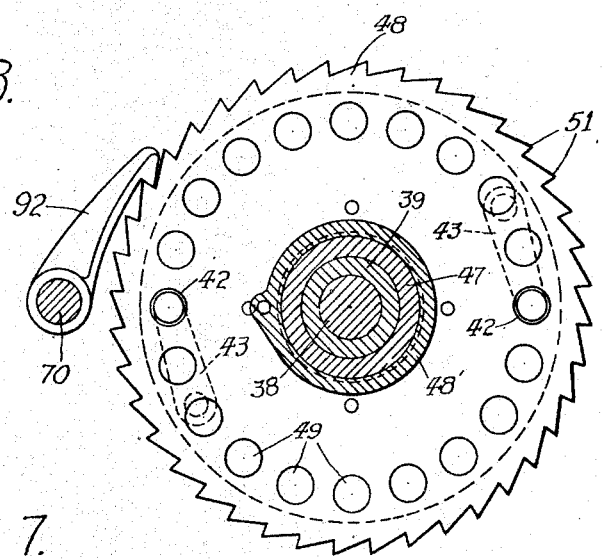
Figure 7:
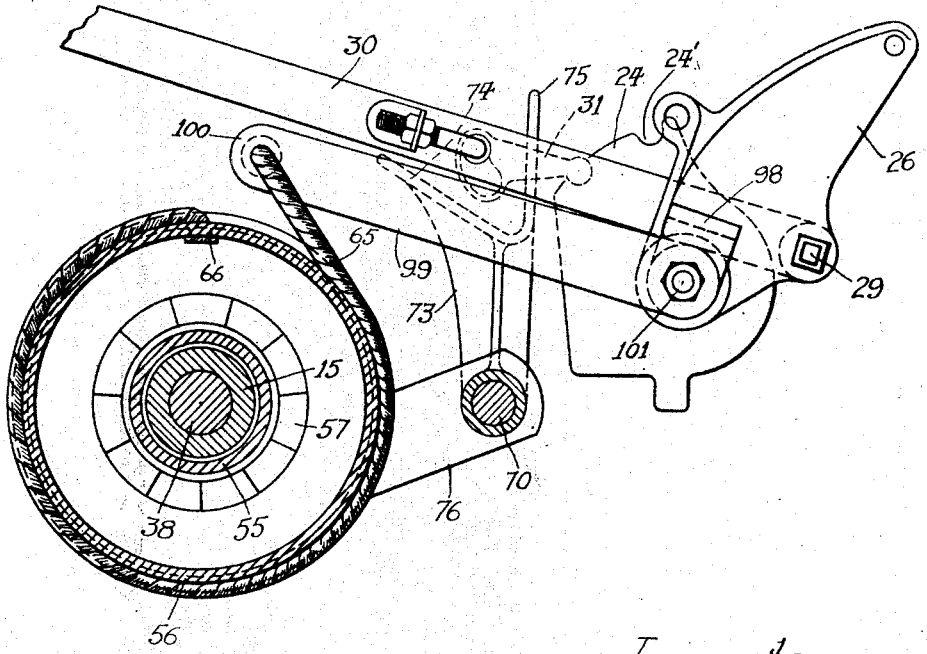

Fig. 7 is an enlarged detail view, partly in section taken along the line 7—7 of Fig. 4 looking in the direction of the arrows, and showing the position of the lifting mechanism when the bar is raised to a vertical position; and Figures 8, 9 and 10 are enlarged detail views partly in section of the different parts taken respectively along the lines 8—8, 9—9 and 10—10 of Fig. 4 and looking in the direction of the arrows.

Referring to the drawings, the mowing machine shown comprises, when broadly construed, the usual wheeled frame 15 mounted on carrying wheels 16 having a draft tongue 17, a coupling member 18, a supplemental coupling member 19, a rocking coupling yoke 20 carried by the grassward end of the main coupling bar and having depending arms 21 whereby it is pivotally connected to the shoe 22 and a finger bar 23 secured to said shoe.

Secured to the grassward side of the tongue socket of the frame 15 is a lever sector 24 provided with the usual notches 24' and with a lateral projecting bearing portion 25. Journaled on the bearing portion 25 is the usual lifting arm 26. The lifting arm 26 is connected to the finger bar 23 by means of a common form of links 27 and a lever extension 28 formed integral with the shoe 22. Pivotally mounted on the lifting arm 26 by means of a bolt 29 is a hand lever 30 provided with a freely rotative gravity pawl 31 which is adapted to engage notches 24' of the sector 24, maintaining the cutter bar in intermediate and vertical positions. For a more detailed description of this construction see my Patent No. 1,237,689, August 21, 1917. The mower here shown is provided with the usual counterbalancing spring 32 connected at its forward end to the hook bolt 33 pivotally attached to the lifting arm 26. The horizontal end of the spring is adjustably connected to the frame 15 by means of an adjustable bolt and bracket 35 fixed to the frame 15 by means of bolts 36. My improved power lifting mechanism will next be described.

This mechanism is adapted to be attached to a mower of the general type without any change or alterations and comprises a driving member 37 fixed to the main shaft 38 and adapted to be connected in the usual way to the traction wheel 16 of the mower. The driving member 37 is provided with a stubblewardly extended bearing portion 39 which is separated from the frame 15 by a washer 40. Secured to the inner face of the member 37 is a pawl supporting disk 41 which is provided with oppositely disposed apertures 42 adapted to receive two spring pressed pawls 43 mounted on the studs 44 fixed to the disk 41. The pawls 43 are normally held in the position shown in Figure 4 by springs 45. Journaled on the bearing portion 39 of the member 37 is a main disk 46 provided with a right hand threaded barrel portion 47. Rotatably mounted on and in threaded engagement with the barrel portion 47 is a supplemental disk 48 having a similarly wide-threaded portion 48' which when rotated with respect to the disk 46 moves laterally to the same from the position shown in Fig. 4 to that shown in Fig. 6 and vice versa. This disk 48 is provided with a series of apertures 49, arranged concentrically and adjacent the perimeter thereof. These apertures are adapted to loosely receive the pawls 43 as shown in Fig. 4. Disks 46 and 48 have a plurality of peripherally arranged ratchet teeth 50 and 51 respectively for the purposes hereinafter set forth.

The traction power storing mechanism for raising the cutter bar comprises a helical spring 52 having its outer end pivotally connected to the main disk 46 at 53, and its inner end connected to the disk 48 at 54. The disk 48 is further provided with a stubblewardly extending bearing portion 55 which extends over but does not bear on the frame 15. Journaled on this bearing portion 55 is a cable drum 56 which is provided with laterally extending clutch teeth 57 normally positioned in engagement with similar teeth 58 on the disk 46 by means of a spring 59 mounted on a head 60 of the drum 56. The spring 59 is held from displacement by the washer 61 which in turn is held secured by a plurality of posts 62 integral with the bearing portion 55 and protruding through the apertures in the washer 61. These posts 62 are provided with apertures 63 adapted to receive cotters to prevent the displacement of the washer 61. The drum 56 has a peripheral groove 64 adapted to wind a cable 65 fixed to said drum at 66.

The mechanism for disengaging the teeth 57 of the winding drum 56 from the clutch teeth 58 of the disk 46 comprises a shipper plate 67, positioned between said drum and disk and having an elongated slot 68. This slotted plate 67 is loosely mounted on and slidably engages the periphery of the teeth 58 of the disk 46. The plate 67 is further provided with forward and rearward arcuate wedge members 69 and 69' respectively formed as an integral part of the plate 67. It will be seen as the shipper plate 67 is shifted from the position shown in Figure 4 to the position shown in Figure 5, the wedges 69 and 69' engage the drum 56 and move the same stubblewardly against the pressure of the spring 59, in which position the clutch teeth 57 and 58 of the drum 56 and disk 46 respectively become disengaged, as shown in Fig. 5.

The mechanism for locking the disks in their different positions comprises a stubblewardly extending shaft 70 having one end 71 bent rearwardly and fixed to the main frame 15 by means of a bolt 72. Rotatably mounted on the shaft 70 is a foot treadle bracket 73 having a bearing portion 73' and provided with substantially horizontal and vertical foot pedals 74 and 75 respectively within easy reach of the operator.

An additional support is provided for the shaft 70 by means of a bracket member 76 fixed to the main frame 15 by the bolts 36. The forward end of the members 76 is adapted to receive and form a bearing for the portion 73' of the bracket 73. The stubbleward end of the bearing portion 73' of the bracket 73 is provided with suitable notches and projections 77 adapted to register with corresponding notches and projections 78 formed as an integral part of a barrel portion 79 of a bevel crank 80 mounted on the shaft 70. By this construction it will be noted that as the foot treadle 73 is rocked the crank 80 is also rocked to perform a function hereinafter described.

The shipper plate 67 is provided with a forwardly extending portion 81 which has a slotted aperture 82 adapted to slide on the shaft 70 on the grassward side of the crank 80. The plate is further provided with a cutaway portion 83 adjacent one side of which is a lug 84 fixed to said plate and positioned in the path of movement of the crank 80 and engageable with an edge 84' of the crank 80 for transferring a forward movement to the plate when the foot treadle 73 is rocked.

The crank 80 is provided with a beveled or inclined edge 85 adapted to engage a forward surface 86 of the wedge member 69 in a manner to shift the plate 67 rearwardly to force the wedges 69 and 69' between the drum 56 and the disk 46 when the foot treadle is oscillated. Pivotally mounted on the shaft 70 on the grassward side of the plate 67 is a crank 87 normally spring pressed into engagement with the ratchet teeth 50 of the disk 46 by means of a spring 88 held into position by an arm 89 formed on the crank 87 and a lateral offset arm 90 formed on the crank 80. The crank 87 has adjacent its free end a stubblewardly projecting lug 91 positioned in the path of the crank 80 and normally engaged by the lug 84 of the crank 80. Journaled on the shaft just outside the pawl 87, and spaced therefrom by a washer 87', is a second pawl 92, normally spring pressed into engagement with the ratchet teeth 51 of the disk 48 by means of a spring 93 which has one end 94 fixed to the pawl and the other end 95 fixed to the shaft 70. Pivotally mounted on the extension 96 of the bearing 25 is a supplemental lever 97 having a laterally projecting lug 98 which normally engages the lifting arm 26 and moves with said arm as a unit. The outer end of the member 97 has formed integrally therewith an upstanding arm 99 with its free end 100 connected to the cable 65. The lifting arm 26 and supplemental lever member 97 are pivotally secured to the sector 24 by means of a bolt and nut 101. The operation of the above construction will next be described.

As the mower is traveling in a forward direction, the member 37 is driven in a clockwise direction in the usual manner by the traction wheel 16 which in turn drives the disk 41 fixed to the member 37. Through the pawls 43, the disk 48 is driven in a clockwise direction and winds up the helical spring 52, storing power in the same. As the disk 48 is being revolved it is also moved stubblewardly by reason of the right-hand-threaded engagement of the barrel portion 48' with the threaded portion 47 of the disk 46. It will be noted that as the disk 48 moves laterally from the position shown in Fig. 4, to the position shown in Fig. 6, the pawls 43 become automatically disengaged from the disk 48 by the pawls 43 withdrawing from the apertures 49 in said disk and the spring 52 becomes wound up and is held in this position by the spring pressed pawl 92 which engages the ratchet teeth 51 of the disk 48. After the helical spring 52 has been wound into the position shown in Figures 6 and 9 the power thus stored may be utilized in raising the cutter bar to an intermediate or vertical position in the following manner: The operator oscillates the foot treadle 73 by pressing the pedal 75 forwardly and through the connections of the bearing portion 73' with the bearing portion 79; the crank 80 which is formed on the portion 79 is oscillated forwardly and the edge 84' of the crank 80 engages the lug 91 formed on the pawl 87 and swings said pawl outwardly disengaging it from the ratchet teeth 50 of the disk 46. When the pawl 87 is disengaged from the teeth 50 the disk 46 revolves in a clockwise direction (see Fig. 9) by the power stored in the spring 52. As the disk 46 revolves in this direction it carries with it the drum 56 by reason of the clutch teeth engagement 57 and 58 between the disk and drum and winds up the cable 65 in a manner to tilt rearwardly the upstanding lever 99 about the bearing 25 and 96 and thereby raise the lifting arm 26 and elevating the cutter bar to intermediate or vertical position. It will be noted from this construction that the cutter bar may be adjusted or raised by the spring 52 to any position between the horizontal and vertical position by the operator releasing the pressure on the pedal 75 and permitting the pawl 87 to engage the teeth 50 when the desired adjustment has been reached.

If the operator desires to lower the cutter bar from vertical or intermediate position to horizontal or cutting position, the pedal 74 is depressed rearwardly and through the connections of the members 73' and 79 the crank 80 is swung rearwardly or in a counterclockwise direction (see Fig. 9) and the beveled surface 85 of the crank 80 engages the forward surface 86 of the wedge 69, forcing the shipper plate 67 rearwardly and thus forcing the wedges 69 and 69' between the drum 56 and the disk 46, disengaging the teeth 57 and 58, as shown in Fig. 5. When the drum 56 is disengaged from the disk 46 the cable 65 is slackened and the cutter bar may be lowered by manipulating the hand lever 30 in the usual manner. After the cutter bar has been lowered, as above described, and the operator desires to connect the drum 56 with the disk 46 to again raise the cutter bar, the foot pedal 75 is forced forwardly and through the connections 73' and 79, the crank 80 is swung upwardly in such a manner that the edge 84' of the crank 80 engages the lug 84 fixed to the plate 67 and shifts the plate forwardly on the shaft 70, withdrawing the wedges 69 and 69' from between the drum 56 and the disk 46, permitting their respective clutch teeth 57 and 58 to again become engaged. The plate 67 is guided in this movement on the shaft 70 and on the periphery of the teeth 58 of the disk 46 by the slotted openings 82 and 68 respectively.

It will be noted in the raising of the cutter bar the spring 52 gradually becomes unwound, carrying with it the disk 46. This revolving unscrews the threaded portion 47 of the disk 46 from the threaded portion 48' of the disk 48 and moves the disk 48 grasswardly until the pawls 43 again engage the disk 48 by entering the apertures 49 of said disk. In this manner it will be seen that the spring 52 is automatically connected with the traction wheel for storing power and that the traction power is automatically disconnected from the spring when the predetermined tension has been obtained by said spring.

It will also be noted that the usual lifting lever mechanism may also be used independently of the power lift mechanism above described, so that either lifting mechanism is at the disposal of the operator.

While I have described but one embodiment which my invention may assume, it is to be understood that modification may be made without departing from the scope of the appended claims.

What I claim as my invention and desire to secure by Letters Patent is:

1. A mower including in combination a frame, a cutting mechanism pivotally connected to said frame, adjusting mechanism for said cutting mechanism, and power actuated resilient means for adjusting said cutting mechanism when said mower is in a standing position.

2. A mower including in combination a frame, traction wheels therefor, a cutting mechanism pivotally connected to said frame, adjusting mechanism for said cutting mechanism, and means for storing the traction power for actuating said adjusting mechanism.

3. A mower including in combination a frame, traction wheels therefor, a cutting mechanism pivotally connected to said frame, adjusting mechanism for said cutting mechanism, and means including a resilient member for storing the traction power for actuating said adjusting mechanism.

4. A mower including in combination a frame, traction wheels therefor, a cutting mechanism pivotally connected to said frame, adjusting mechanism for said cutting mechanism, and means including a helical spring for storing the traction power for said cutting mechanism.

5. A mower including in combination a frame, traction wheels therefor, a cutting mechanism pivotally connected to said frame, adjusting mechanism for said cutting mechanism, means for storing the traction power for actuating said adjusting mechanism, and means for automatically connecting said traction power with said first mentioned means.

6. A mower including in combination a frame, traction wheels therefor, a cutting mechanism pivotally connected to said frame, adjusting mechanism for said cutting mechanism, means for storing the traction power for actuating said adjusting mechanism, and means for automatically disconnecting said traction power from said first mentioned means.

7. A mower including in combination a frame, traction wheels therefor, a cutting mechanism pivotally connected to said frame, adjusting mechanism for said cutting mechanism, means for storing the traction power for actuating said cutting mechanism, and means for automatically connecting and disconnecting the traction power and said first mentioned means.

8. A mower including in combination a frame, traction wheels therefor, a cutting mechanism pivotally connected to said frame, adjusting mechanism for said cutting mechanism, and means encircling said frame for storing the traction power for actuating said adjusting mechanism.

9. A mower including in combination a frame, traction wheels therefor, a cutting mechanism pivotally connected to said frame, adjusting mechanism for said cutting mechanism, and resilient means encircling said frame for storing the traction power for actuating said adjusting mechanism.

10. A mower including in combination a frame, traction wheels therefor, a cutting mechanism pivotally connected to said frame, adjusting mechanism for said cutting mechanism, power lift spring mechanism for said adjusting mechanism and means for tensioning said spring to a predetermined tension.

11. A mower including in combination a frame, cutting mechanism pivotally connected to said frame, adjusting mechanism for said cutting mechanism, power lift spring mechanism for said adjusting mechanism, and traction power means for tensioning said spring to a predetermined tension.

12. A mower including in combination a frame, a cutting mechanism pivotally connected to said frame, adjusting mechanism for said cutting mechanism, power lift spring mechanism for said adjusting mechanism, and traction power means for connecting said power lift spring with said traction wheels.

13. A mower including in combination a frame, traction wheels therefor, a cutting mechanism pivotally connected to said frame, adjusting mechanism for said cutting mechanism, spring lifting mechanism for said adjusting mechanism, means for connecting said traction wheels with said spring mechanism for tensioning said spring to a predetermined tension, and means for automatically disconnecting said traction wheel and said spring mechanism.

14. A mower including in combination a frame, a cutting mechanism pivotally connected to said frame, adjusting mechanism for said cutting mechanism, and traction power storing mechanism for actuating said adjusting mechanism.

15. A mower including in combination a frame, a cutting mechanism pivotally connected to said frame, adjusting mechanism for said cutting mechanism, traction power storing mechanism for actuating said adjusting mechanism, and means independent of said traction power storing mechanism for adjusting said cutting mechanism.

16. A mower including in combination a frame, a cutting mechanism pivotally connected to said frame, adjusting mechanism for said cutting mechanism, traction power storing mechanism for actuating said adjusting mechanism, and means independent of said traction power storing mechanism and mounted on said frame adjacent one side thereof for adjusting said cutting mechanism.

17. A mower including in combination a frame, a cutting mechanism pivotally connected to said frame, adjusting mechanism including a lifting arm for adjusting said cutting mechanism, and traction power storing mechanism connected to said lifting arm for actuating said adjusting mechanism.

18. A mower including in combination a frame, a cutting mechanism pivotally connected to said frame, adjusting mechanism for said cutting mechanism, traction power storing mechanism for actuating said adjusting mechanism, and manually controlled means for connecting said traction power storing mechanism with said adjusting mechanism.

19. A mower including in combination a frame, traction wheels therefor, a cutting mechanism pivotally connected to said frame, adjusting mechanism for said cutting mechanism, traction power storing mechanism mounted on said frame adjacent one of said traction wheels, means for connecting said storing mechanism to said wheel for predetermined periods, and operating connections between said storing mechanism and the adjusting mechanism.

20. A mower including in combination a frame, traction wheels therefor, a cutting mechanism pivotally connected to said frame, adjusting mechanism for said cutting mechanism, traction power storing mechanism mounted on said frame adjacent one of said traction wheels, means for intermittently transmitting power thereto from said wheel, and operating connections between said storing mechanism and adjusting mechanism.

21. A mower including in combination a frame, traction wheels therefor, a cutting mechanism pivotally connected to said frame, adjusting mechanism for said cutting mechanism, traction power storing mechanism on said frame comprising a spring, means for tensioning said spring comprising a member rotatable with said wheel and to which the spring is attached, means controlled by the tension of said spring for connecting and disconnecting said member and wheel, and operating connections between said storing mechanism and adjusting mechanism.

In testimony whereof I affix my signature.

CHARLES PEARSON